Aug. 25, 1942. W. T. HANCOCK 2,293,898
REMOVAL OF ACIDIC CONSTITUENTS FROM PETROLEUM DISTILLATES
Filed Sept. 2, 1941
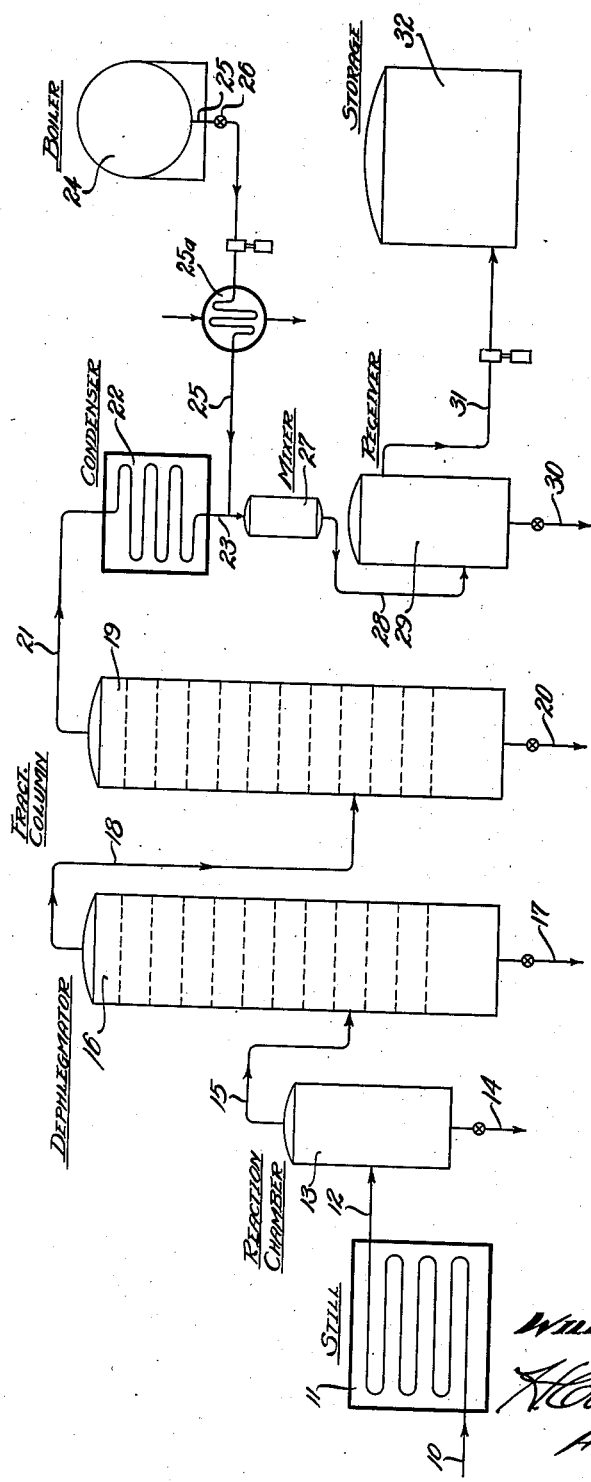
Inventor
WILLIAM T. HANCOCK
H. Calvin White
Attorney Patented Aug. 25, 1942

2,293,898

UNITED STATES PATENT OFFICE 2,293,898

REMOVAL OF ACIDIC CONSTITUENTS FROM PETROLEUM DISTILLATES

William T. Hancock, Long Beach, Calif.

Application September 2, 1941, Serial No. 409,178

11 Claims. (Cl. 196—32)

This invention has to do with the treatment of petroleum hydrocarbons for the removal of acidic constituents, and relates more particularly to the treatment of petroleum distillates, primarily for the purpose of removing hydrogen sulphide. The invention will be described typically as applied to the removal from cracked gasoline distillate of hydrogen sulphide, together with other acidic constituents that may be reactive with the particular alkaline treating materials herein contemplated.

It has long been customary practice to remove hydrogen sulphide from petroleum distillates by treating the latter with caustic soda purchased specially for the purpose, and involving substantial treating costs over a considerable period of time, or in the treatment of large quantities of distillates. My primary object is to utilize for hydrogen sulphide removal, an alkaline residual material which heretofore has had no utility, or at least for the purposes of this invention, and which is available from the boiler units customarily operated in oil refineries or in conjunction with the plant producing the distillate to be treated.

Generally speaking, the invention contemplates using steam boiler water residue for the removal of hydrogen sulphide from the distillate, preferably by a simple and continuous process according to which the residual blow-down from the boiler, which ordinarily is discharged to a sump, is intimately admixed with the gasoline distillate and the latter then separated from the residue. The particular hydrogen sulphide reactive compounds present in the boiler water residue, may of course vary in different locations and with different boiler waters, depending upon the dissolved compounds initially present in the boiler water. In some instances, so-called boiler compounds may be used to reduce the normal hardness of the water, and at other times the boiler compound may serve merely as a carrier for salts and other materials precipitating out of the boiler water, without the boiler compound itself containing water softening chemicals, as such. It is to be understood that the expression "boiler water residue," as herein used, includes the aqueous boiler blow-off stream containing alkaline compounds which may precipitate from the boiler water merely as a result of heating the water, or from the action of water softening compounds in the boiler compound, or be contained in the boiler compound itself, irrespective of the composition of the boiler water.

Typical of boiler water residue compounds reactive with hydrogen sulphide are basic compounds such as calcium or magnesium hydroxide, and the neutral salts reactive with acidic constituents in the distillate. Other compounds reactive with these acidic constituents may include metallic oxides, such as iron oxide, precipitated out of the boiler water or formed by oxidation of metallic surfaces of the boilers.

According to my preferred method of treatment, the cracked distillate vapors are subjected to partial or complete condensation in a suitable condensing zone, and the condensate stream mixed with a continuously flowing stream of the residue being discharged from the boiler or boilers. After thorough agitation, the mixture passes into a receiver wherein the aqueous residue and distillate phases undergo gravity separation to permit separate withdrawal of the residue and distillate from their respective strata.

A more complete understanding of the invention may be had by reference to the accompanying drawing showing diagrammatically and in flow sheet form a typical treating system operating in conjunction with a conventional cracking plant. The drawing is illustrative of a typical system for producing cracked petroleum distillate, according to which a suitable charging stock introduced through line 10, is pumped through the heater or still 11 within which the oil is subjected to cracking temperatures and pressures. The cracked oil stream is discharged from the still 11 through line 12 into a reaction chamber or separating zone 13 wherein the oil and vapors may be maintained, in the usual manner, for a length of time sufficient for cracking and conversion reactions to go to completion, and to permit separation of heavy unvaporized residue which is withdrawn from the chamber through line 14.

The overhead vapors leaving the reaction chamber through line 15 may be subjected to condensation for the recovery of desired fractions, by any suitable method. As illustrative, the vapors are shown first to be introduced to a dephlegmator 16 within which the vapors undergo fractional condensation to produce a relatively high boiling fraction such as gas oil, which is withdrawn from the base of the dephlegmator through line 17. Uncondensed vapors leave the dephlegmator through line 18 and flow into fractionating column 19 within which second stage fractional condensation of the vapors occurs, resulting in the production of an intermediate boiling range condensate, for example largely kerosene distillate, which is taken from the base of the fractionating column through line 20. The vapors leaving the fractionating column through line 21 may consist mainly of gasoline fractions containing, as impurities, acidic constituents or gases such as hydrogen sulphide, and which the present process is intended to remove.

The gasoline hydrocarbons may be treated or contacted with the boiler water residue while in vapor or liquid or mixed vapor and liquid phases, although it is preferred to mix the boiler water residue with the distillate while the latter is at least for the most part in liquid phase. Accordingly, the vapors are passed from line 21 through a suitable condensing zone, such as the tubular condenser 22, from which the condensate, together with any uncondensed vapors and gases, is discharged through line 23. Acid gas constituents such as hydrogen sulphide may be present in solution in the distillate and also in undissolved gaseous form. Whatever their phase condition in the distillate stream may be, such constituents are subjected to the action of the boiler water residue, under conditions of intimate admixing that will assure their removal by reaction with compounds in the boiler water residue that are reactive with acids or acidic gases.

Provision may be made for constant withdrawal of residue from the water of one or more boilers 24 through the usual blow-down line 25, the valve 26 typifying the known control devices for maintaining continuous draw-off of the residue. Through line 25 the boiler water residue is discharged into line 23 to combine with the distillate stream flowing from the condenser. The temperature of the boiler water residue may be controlled to best suit temperature conditions for most effective reaction between alkaline compounds of the residue and acidic constituents of the distillate, by passing the residue through a heat exchanger 25a, which may serve either as a heater or cooler. The combined boiler water residue and distillate streams are subjected to intimate comingling, as by passing them through a suitable mixing chamber 27 wherein the materials remain for a length of time sufficient for reaction of the hydrogen sulphide content of the distillate with alkaline compounds in the boiler water residue. It may be mentioned that ordinarily the boiler water residue will contain an excess of these reactive alkaline compounds over the amount required to combine with all the hydrogen sulphide present in the distillate. Consequently, the residue after separation from the distillate usually will have what may be termed residual alkalinity.

Leaving the mixer 27, the distillate and boiler residue flow through line 28 into a receiver or separating tank 29 within which the boiler water residue and compounds formed by reaction with the acidic constituents of the distillate, settle to the bottom and are drawn off through line 30. The stratified distillate in the upper portion of the receiver is pumped through line 31 for storage in tank 32 or other disposal.

I claim:

1. The process of removing hydrogen sulphide from petroleum hydrocarbons, that includes treating said hydrocarbons with alkaline boiler water residue.

2. The process of removing hydrogen sulphide from petroleum hydrocarbons, that includes treating said hydrocarbons in heated condition with heated alkaline boiler water residue.

3. The process of removing hydrogen sulphide from a stream of petroleum hydrocarbons, that includes continuously withdrawing from a boiler a stream of alkaline boiler water residue, admixing said hydrocarbon and residue streams, and separating the residue from the hydrocarbons.

4. The process of removing hydrogen sulphide from cracked petroleum distillate, that includes treating said distillate with alkaline boiler water residue.

5. The process of removing hydrogen sulphide from cracked petroleum distillate, that includes treating said distillate while at least partially in liquid phase, with alkaline boiler water residue.

6. The process of removing hydrogen sulphide from a stream of cracked petroleum distillate, that includes continuously withdrawing from a boiler a stream of alkaline boiler water residue, admixing said distillate and residue streams, and then separating the residue from the distillate.

7. The process that includes, intimately comingling separate streams of hydrogen sulphide-containing petroleum distillate and alkaline boiler water residue in a mixing zone, and then separating the distillate from said residue.

8. The process that includes, passing cracked petroleum vapors into a condensing zone, admixing condensate formed in said zone with boiler water residue, and then separating the condensate from said residue.

9. The process that includes, passing cracked petroleum vapors into a condensing zone, discharging condensate from said zone into a mixing zone, comingling the condensate in said mixing zone with boiler water residue, and then separating the condensate from the residue.

10. The process that includes, passing cracked petroleum vapors into a condensing zone, continuously withdrawing from a boiler a stream of boiler water residue and admixing the residue with condensate from said condensing zone, and then separating the condensate from the residue.

11. The process that includes, passing cracked petroleum vapors into a condensing zone, continuously withdrawing from a boiler a stream of boiler water residue, continuously admixing the residue with condensate from said condensing zone in a mixing zone, and then separating the condensate from the residue.

WILLIAM T. HANCOCK.